US005852398A

United States Patent [19]

Helman

[11] Patent Number: 5,852,398

[45] Date of Patent: Dec. 22, 1998

[54] APPARATUS FOR INDICATING FAILURE OF AN AIR FILTRATION SYSTEM IN A DIESEL ENGINE

[75] Inventor: Norman Leon Helman, 6701 E. Presidio Rd., Scottsdale, Ariz. 85254

[73] Assignee: Norman Leon Helman, Scottsdale, Ariz.

[21] Appl. No.: 42,113

[22] Filed: Mar. 13, 1998

[51] Int. Cl.$^{6}$ .......... B60Q 1/00

[52] U.S. Cl. .......... 340/438; 356/438; 356/439; 340/627

[58] Field of Search .......... 340/438, 627, 340/630; 250/343, 573; 356/438, 439; 324/453, 454

[56] References Cited

U.S. PATENT DOCUMENTS

| | | | |
|---|---|---|---|
| 3,696,666 | 10/1972 | Johnson et al. . | |
| 3,810,697 | 5/1974 | Steinberg | 356/439 |
| 3,875,891 | 4/1975 | Zeldman . | |
| 4,014,209 | 3/1977 | Emerick . | |
| 4,099,861 | 7/1978 | Abel . | |
| 4,189,707 | 2/1980 | Emert . | |
| 4,580,311 | 4/1986 | Kurz . | |
| 4,601,082 | 7/1986 | Kurz . | |
| 4,748,336 | 5/1988 | Fujie et al. | 250/573 |
| 5,141,309 | 8/1992 | Worwag . | |
| 5,319,827 | 6/1994 | Yang . | |
| 5,673,027 | 9/1997 | Morita | 340/630 |
| 5,699,043 | 12/1997 | Vane et al. | 340/514 |

*Primary Examiner*—Brent A. Swarthout
*Assistant Examiner*—Julie Lieu

[57] ABSTRACT

An apparatus is disclosed for continuously sampling, at a point downstream of the air cleaner, the normally clean air entering an air induction system of a diesel engine to produce a signal indicating a leakage malfunction condition in the air induction system by measuring dust/particulate matter. The disclosed apparatus includes an arrangement in the form of a sample collector assembly for obtaining a representative sample of leakage particulates within the diesel engine intake system, a measurement assembly for the quantification of the dust/particulates by optical methods, a signal conditioning assembly (200), a processor (300), and a remote annunciation assembly (400).

7 Claims, 4 Drawing Sheets

APPARATUS FOR INDICATING FAILURE OF AN AIR FILTRATION SYSTEM IN A DIESEL ENGINE

FIELD OF THE INVENTION

The field of the invention relates generally to diesel engine intake systems, specifically an apparatus for detection of dust or particulates escaping a failed air intake filter assembly.

BACKGROUND OF THE INVENTION

Failure of the intake system of diesel engines results in reduced life and in some cases, catastrophic failure of the engine. These intake systems are constructed with paper cartridge or oil bath air filtration devices to prevent ingestion of dirt and dust particulates. The filtered air is routed to the engine via lengths of large piping constructed with rubber/plastic clamps and elbows. Those engines mounted on earth moving equipment, and stationary engines in dusty environments, are at significant risk to early failure caused by minor filter or intake system breeches.

Due to the abrasive qualities of these particulates, small amounts of dust can increase ring wear, score cylinder walls, and enter into the lubrication system further damaging bearings and other moving parts. Other induction system components, such as turbo charger components, are especially susceptible to very small quantities of dirt and dust particles.

Engine manufactures require that engine owners perform scheduled maintenance on the air filtration system. Failure to maintain the integrity will void the owners warranty if engine failures are due to dust and dirt particulate damage. Engine owners generally change/clean the air filters on a periodic basis, which will not address failures of the filter element or solution.

Thus, the real time monitoring and detection of any dust/dirt particulates is highly advantageous with respect to economics of engine life. Early detection of failures can prevent very costly engine overhauls as well as lost production of the product.

Apparatus for monitoring failure of air filter assemblies in diesel engines are known to the art. One type of such apparatus is disclosed in U.S. Pat. No. 4,189,707, issued to Ronald Ermert (1980), has a measuring arrangement for detecting the pressure differential between ambient air pressure and the air downstream of the primary engine filter. During normal operation of the engine, a vacuum exists in the range of 6–16 inches of water vacuum. This apparatus detects significant loading of dust and particulate matter in the intake filter assembly. The apparatus detects failures due to a hole or leak, as the vacuum falls below predetermined levels. This apparatus detects gross leakage within the intake system, but does not address the primary issue of dust or dirt intrusion due to fine cracks within the intake system. This method fails to detect chronic leakage by small diameter particulates that are detrimental to engine life.

Another means for detecting filter or intake system leakage is disclosed in U.S. Pat. No. 3,696,666 to Johnson et al (1972). The apparatus contains a measuring arrangement for detecting the pressure differential across a small filter placed downstream of the primary filter element. As the loading of dust and particulate matter in the measuring filter assembly increases, the pressure differential across the filter increases. The detected pressure values are, however, subject to fluctuations due to varying volumetric flow of the airstream as the engine speed and loading change. The measuring arrangement detects the pressure fluctuation and activates the attached indicator showing that the primary filter element may have failed. This arrangement may not identify low mass filter media, broken from the filter element proper, that will remain in the turbulent airflow stream. Other false indications can be caused by high humidity environments impacting the pressure differential across the measurement filter assembly. Additionally, the setpoints that the apparatus uses to alert the operator are fixed which can limit the dynamic range of the apparatus. The dynamic range is significantly reduced if the intake system is not thoroughly cleaned at the time the measurement filter is changed. From the engine owner's perspective, the constant replacement of the measurement filter assembly increases additional tasks to the periodic maintenance effort and increased down time for the machine.

Other apparatus for monitoring dust particles due to failure of air filter assemblies involve the scanning of the downstream airflow via optical beams are known to the art. Such apparatus have a measuring arrangement for detecting the particulates by counting electrical pulses caused by the reduction of light reaching a sensor due to the shadow of the particulates in the major airstream path. Other similar apparatus detects the reduction in signal received at the optical detector, due to the attenuation caused by the dust in the airstream. These light-obscuration types of apparatus require a large number of beam paths to cover a large diameter (ranging from 4 to 14 inches in diameter) airstream. The paths can be provided by multiple light sources and detector pairs or by a system of mirrors reflecting a single beam in multiple. These additional components add to the complexity of the detection system.

The electronic detection system in this type of apparatus can be complex, as the pulses generated by the passing particulates may be very short in time duration and vary in intensity.

These particles vary in size and speed due to the high velocity of the airstream in the diesel engine air intake system. These apparatus suffer from the very dust that is being measured by the coating effect of the optical components which increases as the number of beams increase. Present apparatus of this type require larger quantities of dust/particulates within the air stream to be effective.

In general, the light-obscuration types of apparatus provide indications of the rate that dust/particulates are passing through the beam, but do not address the integration of dust ingested over time. The buildup of dirt in the lubricating oil over time is a major factor of shorter engine life which many of these types of detectors fail to address.

OBJECTS AND ADVANTAGES OF THE INVENTION

Therefore, several objects of the present invention are to improve an apparatus of the aforementioned general types in such a way that fluctuations in the volume of the airstream do not lead to incorrect indication of filter failure.

Secondary objects of the present invention are to provide an optical detector capable of sampling and detecting various sizes of particles with a simple device requiring no operationally replacement parts. Another object of the present invention is to provide a system with a large dynamic range that provides a direct method of detection instead of an inference of the quantity of dust. An additional object of the present invention is to provide a capability for a self-calibration to compensate for variations of cleanliness of the detector system to allow for consistent range of detection. Another object of the present invention is to provide the capability to remove the acquired sample for further analysis.

Other advantages and features of the invention will become apparent from a consideration of the ensuing description and the accompanying drawings.

SUMMARY OF THE INVENTION

To achieve the foregoing objects, features, and advantages, and in accordance with the purpose of the invention as embodied and broadly described herein, a filter failure detection apparatus is provided to detect dust intrusion of the primary air filtration system or air intake duct system by detecting increasing levels of dust and providing visual indication of the severity of leakage. The apparatus comprises a dust/particulate sampling means, a sample collection and detection means, a signal processing means, and an indication/power means.

The sampling means is located within the diesel engine induction tubing downstream of the primary filter element assembly and prior to the engine induction system or turbocharger. A portion of the air flow impinges on the deflection member causing any entrained dust particles to be channeled to the sample collection means. The dust sample is funneled into a detection chamber where an optical detector quantifies the dust layer. The detected signal is further processed by a signal processing means and any unacceptable rise in the detected dust level is visually displayed to the engine operator. The indication circuit may include visual and audible warning devices or any combination thereof.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE DRAWINGS

Additional objects and advantages of the present invention will be more readily apparent from the following detailed description of preferred embodiments thereof when taken together with the accompanying schematic drawings, in which.

Reference Numerals In Drawings

| | | | |
|---|---|---|---|
| 1 | Dust/particulate sampling means | 2 | Diesel engine air intake structure |
| 3 | Radial transmission hole | 4 | Inner surface of the deflection member. |
| 5 | Deflection Member | | |
| 101 | Infrared light source | 102 | Ingress optic |
| 103 | Sample collection means | 104 | Egressing optic |
| 105 | Photoreceptor | 106 | Light detector assembly |
| 108 | Sample collection syncline cavity | 109 | Narrow portion of the funnel shaped cavity |
| 110 | Photoreceptor mounting member | 180 | Light source electrical cable |
| 181 | Photoreceptor electrical cable | 200 | Signal conditioning means |
| 201 | Amplifier stage | 202 | Schmitt trigger stage |
| 203 | Current amplifier stage | 300 | Processor means |
| 301 | Programmed microcomputer unit | 302 | Auto-calibration/reset switch |
| 400 | Remote annunciation means | 403 | Red indicator lamp |
| 404 | Yellow indicator lamp | 405 | Green indicator lamp |
| 500 | Light source control means | 501 | Power regulator |
| 502 | Current driver | 503 | Resistive ladder |

SUMMARY

In accordance with the present invention a dust/particulate detector comprising means for providing the detector in communication with the airflow of the diesel engine, means for depositing said dust/particulates on an optical sensor contained within the detector, means for detecting changes in opacity of the dust/particulates deposited on the sensor, causing optically detectable changes in transmitted optical signals in the dust/particulate sensor; and means for calibrating the detector to produce a number of reference levels for comparison and indication.

DETAILED DESCRIPTION OF THE PREFERRED EMBODIMENTS

Reference will now be made in detail to the present preferred embodiments of the invention as described in the accompanying drawings which form a part hereof and in which is shown by way of illustration a specific embodiment in which the invention may be practiced. This embodiment is described in sufficient detail to enable those skilled in the art to practice the invention, and it is to be understood that the other embodiments may be utilized and that structural or logical changes may be made without departing from the scope of the present invention. The detailed description is, therefore, not to be taken in a limiting sense, and the scope of the present invention is defined by the appended claims.

Figure 1:
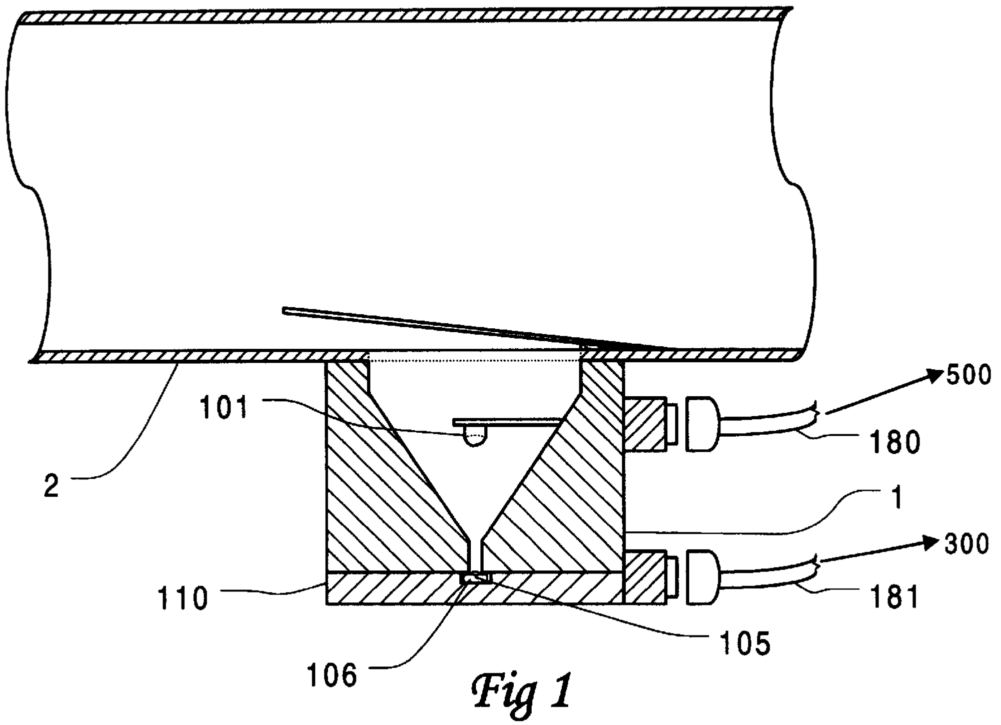
FIG. 1 is a cross-section view of the dust/particulate sampling means which is associated with the air intake structure located downstream of the primary filtration assembly of the diesel engine.

FIG. 1 is a partial cross-section illustrating the relationship of a dust/particulate sampling means 1, a diesel engine air intake structure 2, a sample collection and detection means (partial) 103, a infrared light source 101, and photoreceptor 105 as practiced in one embodiment of the present invention. The sampling means 1 is fixedly mounted to the air intake structure 2 in a known manner that provides an airtight fit. The light source 101 is integrated in a known manner within the sampling means 1. The photoreceptor element 105 is integrated within a light detector assembly 106. A light source electrical cable 180 comes from a light source control means 500 and provides power to the light source 101. The signal generated by the photoreceptor element 105 is transmitted via a photoreceptor electrical cable 181 to a processor means 300.

Figure 2:
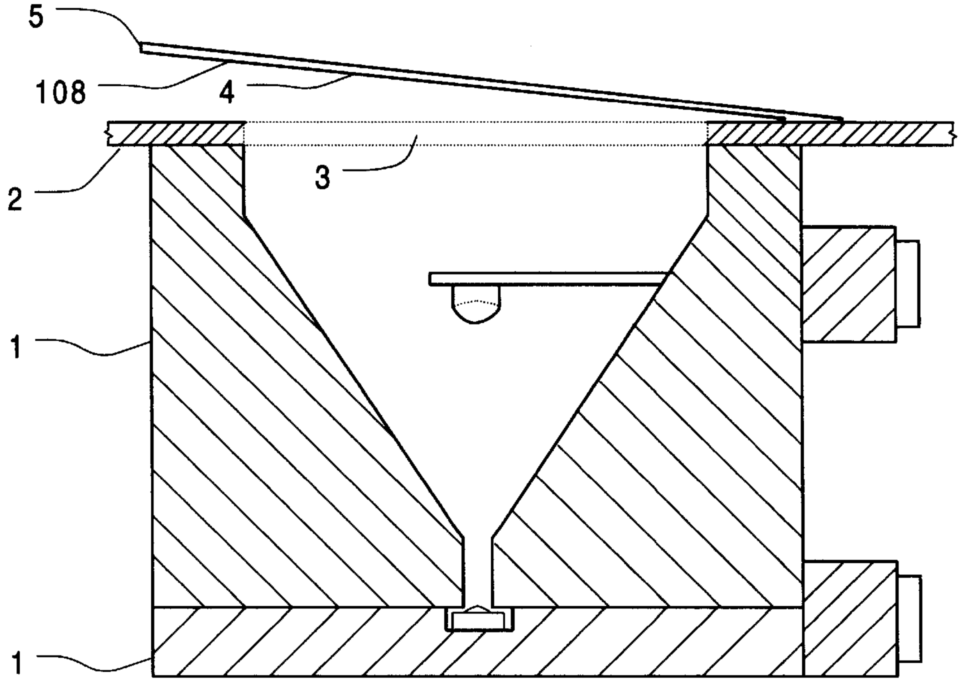
FIG. 2 is a cross-section view of one exemplary embodiment of the inventive apparatus in an intake structure.

FIG. 2 is a partial cross-sectional view illustrating the dust/particulate sampling means as practiced in one embodiment of the present invention. The sampling means 1 comprises a deflection member 5 that is located within the diesel engine induction tubing downstream of said primary filter element assembly. The deflection member 5 is shaped as to encompass a section of the lower semi-circular portion of the peripheral wall of the air intake structure induction tubing 2 and is mounted obtuse to the flow of air passing therethrough the duct. The deflection member 5 protrudes into the airstream an amount 5%–10% of the radius of the intake structure induction tubing 2. The deflection member is shaped in a manner that provides a small resistance to the overall duct airflow. The deflection member is shaped to rapidly reduce the air flow velocity of the secondary laminar air flow and of a portion of the more centralized turbulent flow located within the induction tubing. The angle of attack of the leading edge of the deflection member 5 will tend to aid the transition of the air-flow toward the center of the intake structure induction tubing 2. This transition causes a portion of the dust/particulate matter to impinge on the inner surface 4 of the deflection member 5. The deflection member 5, being formed at the center of the arc of the induction tubing 2, is aligned vertically with a radial transmission hole 3 opening within the intake structure induction tubing 2 toward the sample collection cavity.

As the velocity of the air, containing a concentration of dust/particles, is rapidly reduced, a quantity of dust/particles is deflected by the deflection member 5. The dust/particles are propelled via the force of gravity due the mounting location on the engine and aided advantageously by the vibration of the entire assembly, traversing downward toward the center of the arc of the induction tubing 2 to the transmission hole 3. This hole is channeled directly to the sampling means 1.

Figure 3:
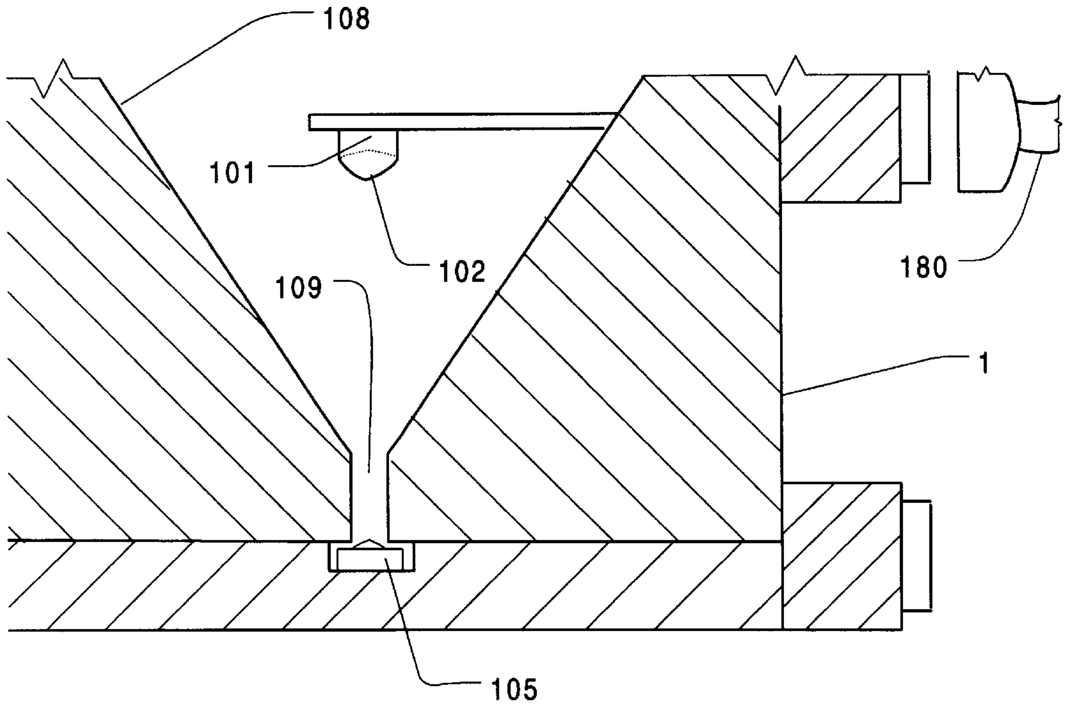
FIGS. 3 and 4 are longitudinal cross-section views of the sample directing and light source assembly and of the light detection and sample containment assembly which is associated with the dust/particulate sampling assembly.

FIG. 3 is a partial cross-section view illustrating the sample collection and detection means as practiced in one embodiment of the present invention. The sample collection and detection means comprises a circular sampling means 1, a light source 101, ingress optic 102, and a light source electrical cable 180. The sample collection means 103 is fixedly mounted to the air intake structure 2 in a known manner that provides an airtight fit. The sampling means 1 contains a syncline cavity 108 for the purpose of providing a conduit for dust particles to the photoreceptor 105. Power is supplied to the light source 101 through a light source electrical cable 180 from a light source control means 500. The light source 101 generates a beam of light with a wavelength centered around 950 NM, that is converged to a narrow beam with a divergence angle of 17 degrees of arc by the ingress optic 102. This beam is oriented axially toward the narrow portion 109 of the syncline cavity 108 that is in communication with the photoreceptor 105. The intensity of the infrared beam is directly proportional to the current supplied to the light source 101 by a light source control means 500.

The dust/particulate matter, propelled via the force of gravity due the mounting location on the engine, traverses through the syncline cavity 108, aided advantageously by the vibration of the entire assembly, past the light source 101, and continues towards the narrow tubular portion 109, and is collected upon the photoreceptor device 105.

Figure 4:
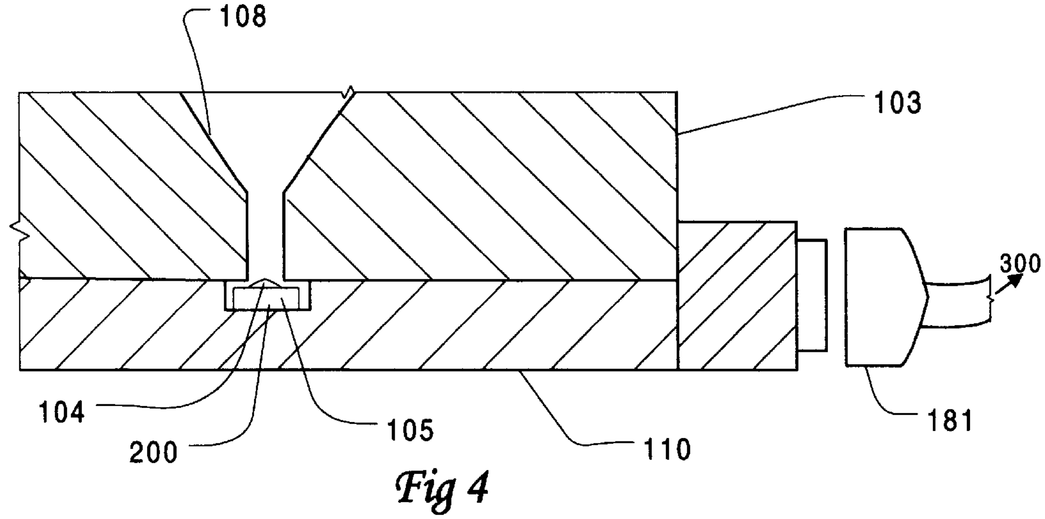

Further, in FIG. 4, the sample collection and detection means comprises the circular sampling means 1, the photoreceptor 105, the egressing optic 104, a photoreceptor mounting member 110, and a photoreceptor electrical cable 181. The sampling means 1 contains syncline cavity 108 for the purpose of providing a conduit for dust particles deflected by the deflection member 5.

The light from the light source 101 is oriented axially through the narrow portion 109 of syncline cavity 108 impinging upon the egressing optic 104, which converges the light upon the infrared light photoreceptor 105. The intensity of the light reaching the photoreceptor 105 is aided advantageously by the convergence of the egressing optic 104 that features a 25 degrees of arc acceptance angle. The photoreceptor 105 generates an electrical signal which is transmitted to the signal conditioning means 200. The photoreceptor 105 is affixed to the photoreceptor-mounting member 110 which is fixedly mounted to the sampling means 1 in a known manner that provides an air-tight fit. The known mounting manner provides a method for easily removing the photoreceptor mounting member 110 to simply extract the collected dust/particulate matter for further analysis which addresses one of the advantages of this invention. The electrical signal produced by the signal conditioning means 200 is transmitted via the photoreceptor electrical cable 181 to the processor means 300. In one embodiment of the invention, a portion of the syncline cavity 108 is included within the photoreceptor-mounting member 110 to provide an increased cavity volume for collection of the sampled particles.

The dust/particulate matter, propelled via the force of gravity due the mounting location on the engine, traverses through the funnel shaped cavity, aided advantageously by the vibration of the entire assembly, therethrough the narrow tubular portion 109, past the light source 101, continuing towards and collecting upon the infrared light photoreceptor device 105. The concentrating action by the narrow tubular portion 109 provides an increased quantity of matter for light reduction as compared to the types of prior art apparatus that pass a quantity of the sample through the beam of light which addresses an object of the present invention. As the concentration of the dust/particulate matter increases, the intensity of light reaching the photoreceptor is reduced causing a reduction of the electrical signal generated by the infrared light photoreceptor 105. This reduction changes the level of electrical signal processed by the signal conditioning means 200. The intensity of the optical emissions by the light source 101 is remotely controlled by the processing means 300. The processing means 300 controls the light source emissions through a wide predetermined range, the advantage of an increased dynamic range is effected, thereby meeting one of the advantages of the present invention. This feature allows the processing means to determine the quantity of the dust/particulate matter blocking the light from the light source. By continuously sampling the blockage level over time, the rate of change of increasing opacity can be determined and annunciated to the operator. With the changes in severity of the dust/particulate ingestion, the operator may opt to disable the engine or to continue engine operation with the ability for continued detection of dust/particulates indicating a failure condition of the engine filter equipment.

Figure 5:
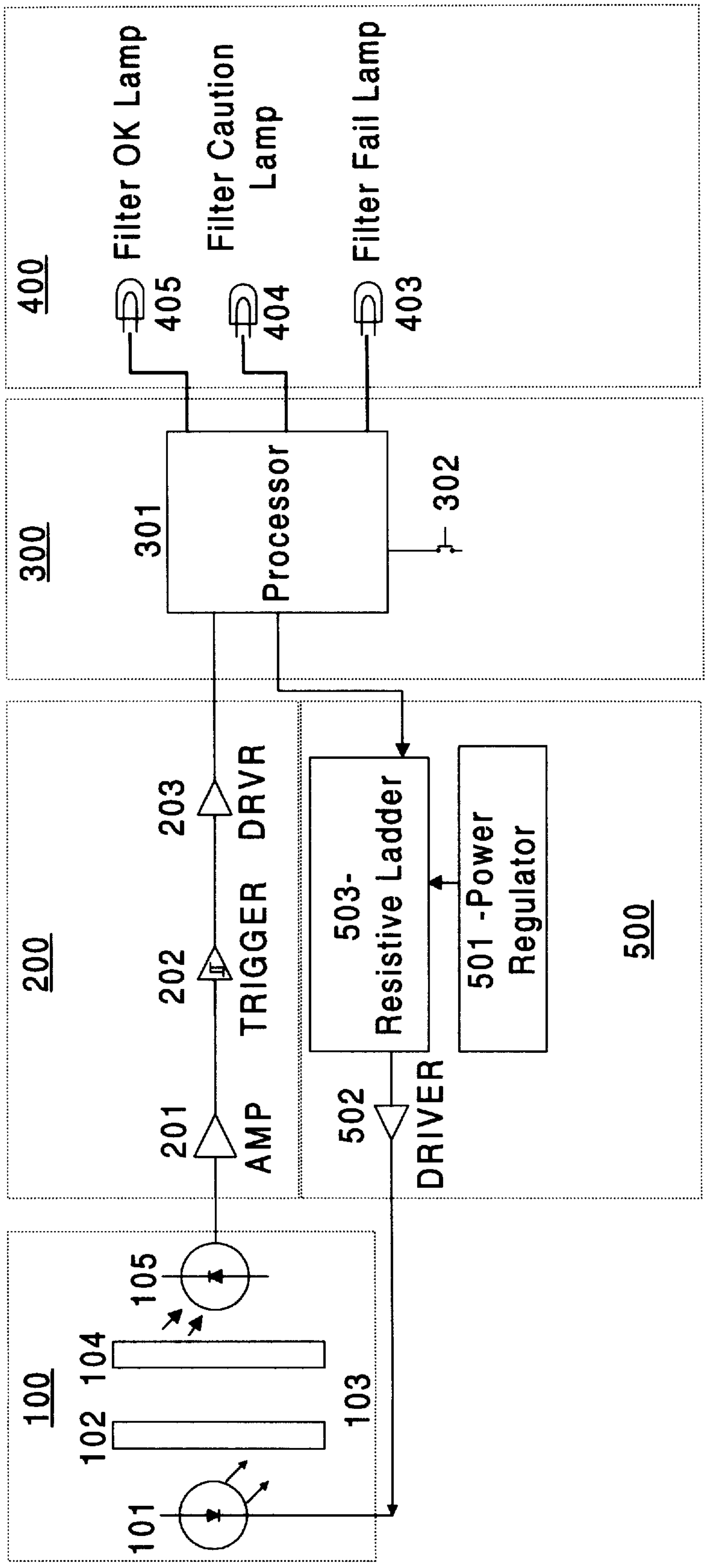
FIG. 5 is a block diagram of the electronic circuitry which is associated with the light detection and sample containment assembly and with the signal processing and indication means.

FIG. 5 is a schematic illustration of one embodiment of the present invention illustrating the dust/particulate sensing means 100, the signal conditioning means 200, the processor means 300, the remote annunciation means 400, and the light source control means 500.

The sensing means 100 of the present invention comprises the light source 101, ingress optic 102, the collection chamber 103, an egressing optic 104, and the photoreceptor 105. The intensity of infrared emission provided by light source 101 is controlled by the light source control means 500. The infrared light is transferred to the ingress optic 102, which delivers the light to the photoreceptor 105 via the egressing optic 104. Any concentration of dust/particulates present within the sampling means 1 directly impacts the intensity of infrared light reaching the photoreceptor 105 via the egressing optic 104. The efficiency of the optical system is improved via the use of the ingress optic 102 which converges the infrared light being emitted by the light source 101. The physical position of the ingress optic 102 within the sample collection chamber 103 maximizes the light transferred through the narrow portion of the sample collection chamber 103 by converging the light advantageously at the opening of the narrow portion of the sample collection chamber 103. In addition, the egressing optic 104, converges the received infrared light which advantageously maximizes the intensity of light impinging upon the photoreceptor 105. The photoreceptor 105 generates an electrical signal which is transferred to the signal conditioning means 200.

The signal conditioning means 200 comprises an amplifier stage 201, a Schmitt trigger stage 202, and a cable driver stage 203. The signal generated by the photoreceptor 105 is magnified by the amplifier stage 201 and applied to a Schmitt trigger stage 202. The Schmitt trigger stage 202 provides a consistent switching point for the electrical signal from the amplifier stage 201 to convert the analog signal, as generated by the photoreceptor 105, to a binary digital signal. The digital signal is then transferred to a current amplifier stage 203. The current amplifier stage 203 provides an amplification of the digital signal and the ability to drive a length of cable to the processor means 300, which is remotely located.

The processor means 300 comprises a programmed microcomputer unit (hereinafter referred to as "the MPU") 301 used as calculation means for executing below-mentioned various types of calculation processing, and the like, and an auto-calibration/reset switch 302. The MPU 301 contains a read-only memory that is preprogrammed with the operational software. The remote annunciation means 400 comprises a red indicator lamp 403, a yellow indicator lamp 404, and a green indicator lamp 405. The MPU 301 drives the indicator lamps in accordance with the severity of dust/particulate matter as detected in the sample detection means.

The light source control means 500 comprises a power regulator 501, a current driver 502, and resistive ladder 503. The regulator 501 provides a non-varying voltage source, isolated from the diesel engine electrical power system, for consistent operation of the resistive ladder 503, the current driver 502, and the infrared light source 101. The resistive ladder 503 provides an analog electronic signal to the current driver 502 stage based upon a digital value generated by the MPU. The current driver 502 stage controls the magnitude of current provided to the infrared light source 101.

System Operation

Figure 6:
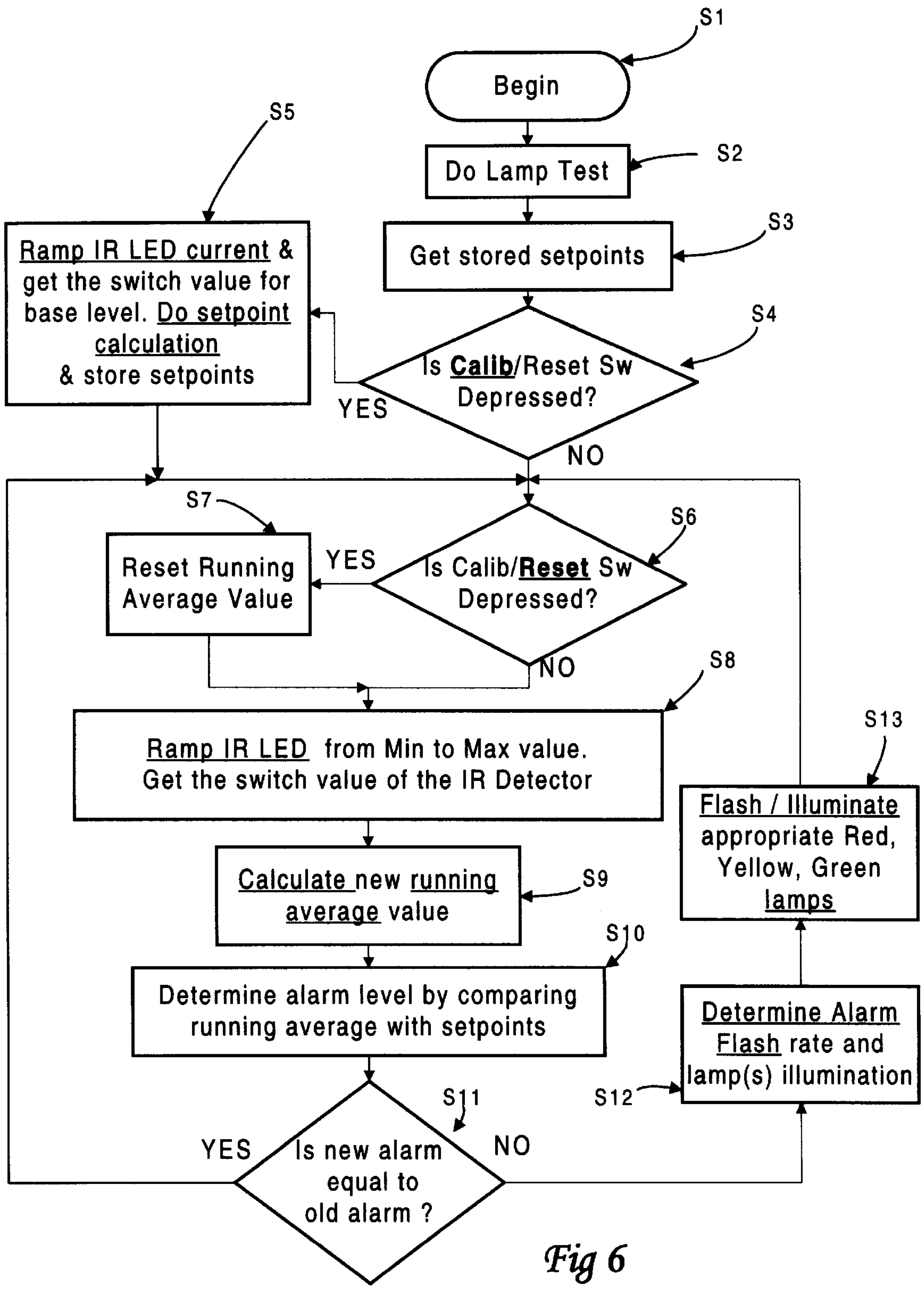
FIG. 6 is a flow chart illustrating the operation of the system controlled by the microcomputer which is associated with the signal processing means.

Details of the system operation are best understood by referring to FIG. 6. Upon power up of the system, in step S1, the MPU will execute house-keeping chores and then, in step S2, flash the Green 405, Yellow 404, and Red 403 indicator lamps to allow the operator to verify that the system is operational. The MPU then, in step S3, retrieves the last calculated setpoints from non-volatile memory for current use.

In step S4, the auto-calibration/reset switch 402 is then tested to determine if the operator desires a self-Calibration to be performed. If so, the base light intensity value is determined in step S5, by traversing, in an increasing manner, a predefined curve based upon the linear region of light intensity vs. current flow of the light source 101. The MPU 401 sends the digital signal to the resistive ladder 503 that is comprised of a set of resistances that vary a generated current in a binary manner. The signal current, as controlled by the resistive ladder 503, provides an analog electronic signal to the current driver 502 stage based upon a digital value generated by the MPU. The current driver stage 502 controls the magnitude of current provided to the infrared light source 101. As the intensity of the light emission, as generated by the light source 101, increases, the photoreceptor 105 will switch to the set state. The intensity of the light required to switch the photoreceptor 105 state is based upon the current attenuation parameters of distance between the light source 101 and the photoreceptor 105, attenuation caused by the cleanliness of the photoreceptor 105, and various optical reflections within the sample collection member 103. At this point, the digital value that was converted to infrared lamp power is stored in the MPU as a digital code indicative of the light value required to switch the state of the photoreceptor system. The advantage of this process provides the capability of a larger range of detection as compared to apparatus that include a fixed intensity light source. The process is similar in action to single slope analog to digital converters used in digital devices that are presented with analog voltage or current signals. This process is repeated in multitude and the resultant digital light values are averaged and stored as the base value. If the photoreceptor 105 signal fails to switch at any point within the ramp, the system indicates a failure mode to the operator which meets an object of the invention.

The capability of determining the base value is an object of the invention as the system can allow for some variations of the cleanliness of the base system after changing of the air cleaner system components or repair of the engine intake ductwork system. Other prior art systems use fixed or predetermined setpoints of the parameter variables that is used to annunciate an unwanted condition to the engine operator. With the prior fixed setpoint design, it is imperative that the system is always returned to a known state at each maintenance period, possibly increasing the down time of the machine.

Using this base value, step S5 calculates 5 threshold values (hereinafter referred to as "setpoints") correlating to the previously determined lamp intensity output vs. operating current response curve of the infrared light source 101 and summing with the previously determined base value. These setpoints are then stored in non-volatile memory for use in operational cycle.

The auto-calibration/reset switch 302 is then tested for depressed state in step S6. If so, the current running average is reset to the base value as determined by the last calibration in step S7. This capability can be used to verify that the determined alarm level is repeatable at any time.

In step S8, the MPU 301 then obtains a new value of lamp level using the ramping steps as described above. The value is proportional to the quantity of dust deposited upon the photoreceptor by relating the opacity of the dust/particulates to quantity. This new value and the current running average value are averaged to produce an updated running average in step S9. The current running average value is then compared to the 5 setpoints calculated in the last calibration cycle to determine the new alarm level state in step S10.

Next, in step S11, the new alarm level state is compared to the current alarm level state to determine a level change, either increasing or decreasing in severity. If the alarm levels are equal, the program then returns to the point in the loop that tests the reset switch 302 (Step S6) for depressed state. If the alarm levels are not equal, in step S12, the annunciation logic then determines which alarm lamp(s) 403, 404, 405 are to be illuminated. Step S13 flashes the appropriate alarm lamp(s) 403, 404, 405 to provide the operator with a sense of severity of the quantity of dust/particulate matter in the engine intake system. The program continues the acquisition and alarm cycle to continuously update the alarm state and the subsequent indications to provide the operator a real-time indication of the severity of the failure of the engine filtration system or intake ducting. The operator can evaluate filter failure condition by being cognizant of the time until the next transition of the alarm lamps 403, 404, and 405.

Conclusion and Scope

Accordingly, the reader will see that the improved dust/particulate detection apparatus of this invention reduces incorrect indications of filter failure due to fluctuations in the volume of the airstream.

Furthermore, the dust/particulate detection apparatus has the additional advantages in that

- it requires no operationally replacement parts to assure proper operation;
- it eliminates the effects of high humidity causing varying pressure differential across the filter;
- it provides the capability of self-calibration to compensate for variations of cleanliness of the detector system;
- it provides the capability of collection of the sampled dust/particulate matter and ability to remove the matter for further analysis;
- it has the ability to sense any particulate matter in the intake system as result of failures, cracking of subcomponents, or like failures;
- it provides direct indication of the presence of damaging dust/particulate matter, not inferred by variances in engine vacuum;
- it provides an increased dynamic range of detection over other light obscuration apparatus; and
- it provides a relative indication of dust sampled over time or integrated indication as compared to the instantaneous value indications of over other light obscuration apparatus.

One skilled in the art will appreciate that the invention may be embodied in other specific forms. The invention is intended to be embraced by the appended claims and not limited by the foregoing embodiment.

What is claimed is:

1. A dust/particulate detector monitoring the failure of the air filtration unit and air intake ducting of a diesel engine by generating a signal indicative of the concentration of dust/particulates entrained in the air flow of the diesel engine downstream of the filtration devices and intake system ducting resulting from failures of the devices comprising:

Means for providing the detector in communication with the airflow of the diesel engine;

Means for depositing said dust/particulates on an optical sensor contained within the detector;

Means for detecting changes in opacity of said dust/particulates deposited on the sensor, causing optically detectable changes in transmitted optical signals in the dust/particulate sensor;

Means for calibrating the detector to produce a number of reference levels for comparison and indication.

2. A dust/particulate detector according to claim 1, wherein the communication means comprises a predetermined shaped deflector device disposed within in the air flow of the diesel engine downstream of the filtration devices for obtaining a representative sample of the entrained dust/particulates and routing the sample to the sensor.

3. A dust/particulate detector according to claim 1, wherein the depositing means comprises a syncline cavity assembly to route and concentrate the sample at the sensor location.

4. A dust/particulate detector according to claim 1, wherein the detecting means comprises: an optical receptor arranged to receive an optical signal from a light emitting device passing through the concentrated sample and generates a signal relative to the opacity of said dust/particulates deposited on the sensor.

5. A dust/particulate detector according to claim 1, wherein the detecting means comprises: calculation means for processing the signal for conversion to a digital signal and comparison to predetermined levels for indication.

6. A dust/particulate detector according to claim 1, further including means for controlling the optical light source increases the dynamic range of detection.

7. A dust/particulate detector according to claim 1, wherein the calibrating means comprises: calculation means for processing the signal to a base value and for generating comparison levels after cleaning/maintenance of the dust/particulate sensor.

* * * * *